United States Patent
Kim et al.

(10) Patent No.: US 7,082,960 B2
(45) Date of Patent: Aug. 1, 2006

(54) PIPE TAPPING APPARATUS

(75) Inventors: Young Sik Kim, 517-7, Taejeon-Dong, Gwengju-City, Gyeonggi-Do (KR); Michael T. Deason, Birmingham, AL (US)

(73) Assignees: Young Sik Kim, Gwengju (KR); M.T. Deason Company, Inc., Birmingham, AL (US)

( * ) Notice: Subject to any disclaimer, the term of this patent is extended or adjusted under 35 U.S.C. 154(b) by 107 days.

(21) Appl. No.: 10/958,020

(22) Filed: Oct. 4, 2004

(65) Prior Publication Data

US 2006/0027266 A1    Feb. 9, 2006

(30) Foreign Application Priority Data

Aug. 3, 2004    (KR) ...................... 10-2004-0061182

(51) Int. Cl.
*F16K 43/00*    (2006.01)
(52) U.S. Cl. ................ 137/318; 285/288.2; 285/288.11
(58) Field of Classification Search ................ 137/317, 137/318; 285/288.2, 288.11; 138/89, 94
See application file for complete search history.

(56) References Cited

U.S. PATENT DOCUMENTS

| | | | | |
|---|---|---|---|---|
| 3,516,690 A | * | 6/1970 | Kreig | ...................... 285/288.2 |
| 4,348,041 A | * | 9/1982 | Imai et al. | ................ 285/288.2 |
| 5,964,240 A | * | 10/1999 | Granovski | ................... 137/318 |
| 6,068,019 A | * | 5/2000 | Lee | ............................. 137/318 |
| 6,357,470 B1 | * | 3/2002 | Evans et al. | ................ 137/317 |
| 6,755,216 B1 | * | 6/2004 | Mostala | ....................... 138/98 |

FOREIGN PATENT DOCUMENTS

JP    2002-137121    5/2002

* cited by examiner

*Primary Examiner*—Kevin Lee
(74) *Attorney, Agent, or Firm*—Frommer Lawrence & Haug LLP; Ronald R. Santucci

(57) ABSTRACT

The present invention provides a pipe tapping apparatus to couple new pipes to an existing pipe. The pipe tapping apparatus includes a base pipe, having a saddle-shaped socket part to be in close contact with the main pipe to pass a fluid therein; and a bending part coupled to the saddle-shaped socket part. The pipe tapping apparatus further includes a coupling pipe to be coupled to the sub-pipe extending to a predetermined place in which the supplied fluid is used, with a ball valve provided in the coupling pipe to control the flow of fluid passing through the coupling pipe. The pipe tapping apparatus further includes an electric heat-welding pipe to couple the coupling pipe to the base pipe. The electric heat-welding pipe has a first heating wire which is provided in the electric heat-welding pipe to weld the electric heat-welding pipe to the base pipe, and a second heating wire which is provided in the electric heat-welding pipe to integrate the coupling pipe with the electric heat-welding pipe. The pipe tapping apparatus further includes a first positioning unit which is removably coupled to an end of the coupling pipe, with a first through hole provided in the center of the first positioning unit, thus guiding a process of tapping the main pipe using the cutting drill passing through the first through hole of the first positioning unit.

4 Claims, 4 Drawing Sheets

PIPE TAPPING APPARATUS

This application claims priority benefits from Korean Patent Application No. 10-2004-0061182 filed Aug. 3, 2004.

BACKGROUND OF THE INVENTION

1. Field of the Invention

The present invention relates generally to pipe tapping apparatuses, and more particularly, to a pipe tapping apparatus to couple new pipes to an existing pipe.

2. Description of the Related Art

Generally, gas pipes and city water pipes (hereinafter, referred to simply as main pipes) are arranged in the ground. The above-mentioned main pipes supply gas or water to structures, such as households, offices and factories, etc. Therefore, when the above-mentioned structures are constructed, the main pipes are simultaneously arranged in the ground around the structures. To arrange the main pipes in the ground, the ground is dug over a distance of several kilometers. Thereafter, the main pipes having lengths of several kilometers are placed in troughs in the ground prior to being covered with soil. Thus, the process of arranging the main pipes in the ground is completed. However, huge costs are incurred when installing the main pipes in the ground.

Therefore, when additional buildings or factories are built around the existing structures, if additional main pipes for the additional buildings or factories are required to be installed in the ground, it is very expensive. To avoid excessive expense, separate sub-pipes are coupled to the additional buildings or factories. Thereafter, the separate sub-pipes are coupled to the existing main pipes, thus reducing construction costs.

SUMMARY OF THE INVENTION

Accordingly, the present invention has been made keeping in mind the above problems occurring in the prior art, and an object of the present invention is to provide a pipe tapping apparatus to easily couple a sub-pipe to an existing main pipe, thus enhancing economical efficiency.

In order to accomplish the above object, the present invention provides a pipe tapping apparatus, by which a sub-pipe branches from a main pipe through an electric heat-welding process and a tapping process is executed using a cutting drill. The pipe tapping apparatus includes: a base pipe, having a saddle-shaped socket part to be in close contact with an upper portion of an outer surface of the main pipe to pass a fluid therein, and a bending part coupled to the saddle-shaped socket part while being in close contact with a lower portion of the outer surface of the main pipe; a coupling pipe to be coupled to the sub-pipe extending to a predetermined place in which the supplied fluid is used, with a ball valve provided in the coupling pipe to control a flow of the fluid passing through the coupling pipe; an electric heat-welding pipe to couple the coupling pipe to the base pipe. The electric heat-welding pipe has a first heating wire which is provided in the electric heat-welding pipe to weld the electric heat-welding pipe to the base pipe, and a second heating wire which is provided in the electric heat-welding pipe to integrate the coupling pipe with the electric heat-welding pipe. The pipe tapping apparatus further includes a first positioning unit removably coupled to an end of the coupling pipe, with a first through hole provided in the center of the first positioning unit, thus guiding a process of tapping the main pipe using the cutting drill passing through the first through hole of the first positioning unit.

The pipe tapping apparatus may further include a main heating wire provided in the saddle-shaped socket of the base pipe to weld an inner surface of the saddle-shaped socket to the outer surface of the main pipe.

The pipe tapping apparatus may further include a second positioning unit placed in the base pipe to move vertically, with a second through hole provided in the center of the second positioning unit.

The welding of the coupling pipe to the base pipe may be completed before a power terminal coupled to the second heating wire is cut in the coupling pipe or on the same plane as the outer surface of the coupling pipe, thus providing a module system which allows a process of welding an inner surface of an upper part of the electric heat-welding pipe to an outer surface of a lower part of the coupling pipe using the second heating wire heated by power supplied to the power terminal to be excluded from a constructing process in a field building site.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
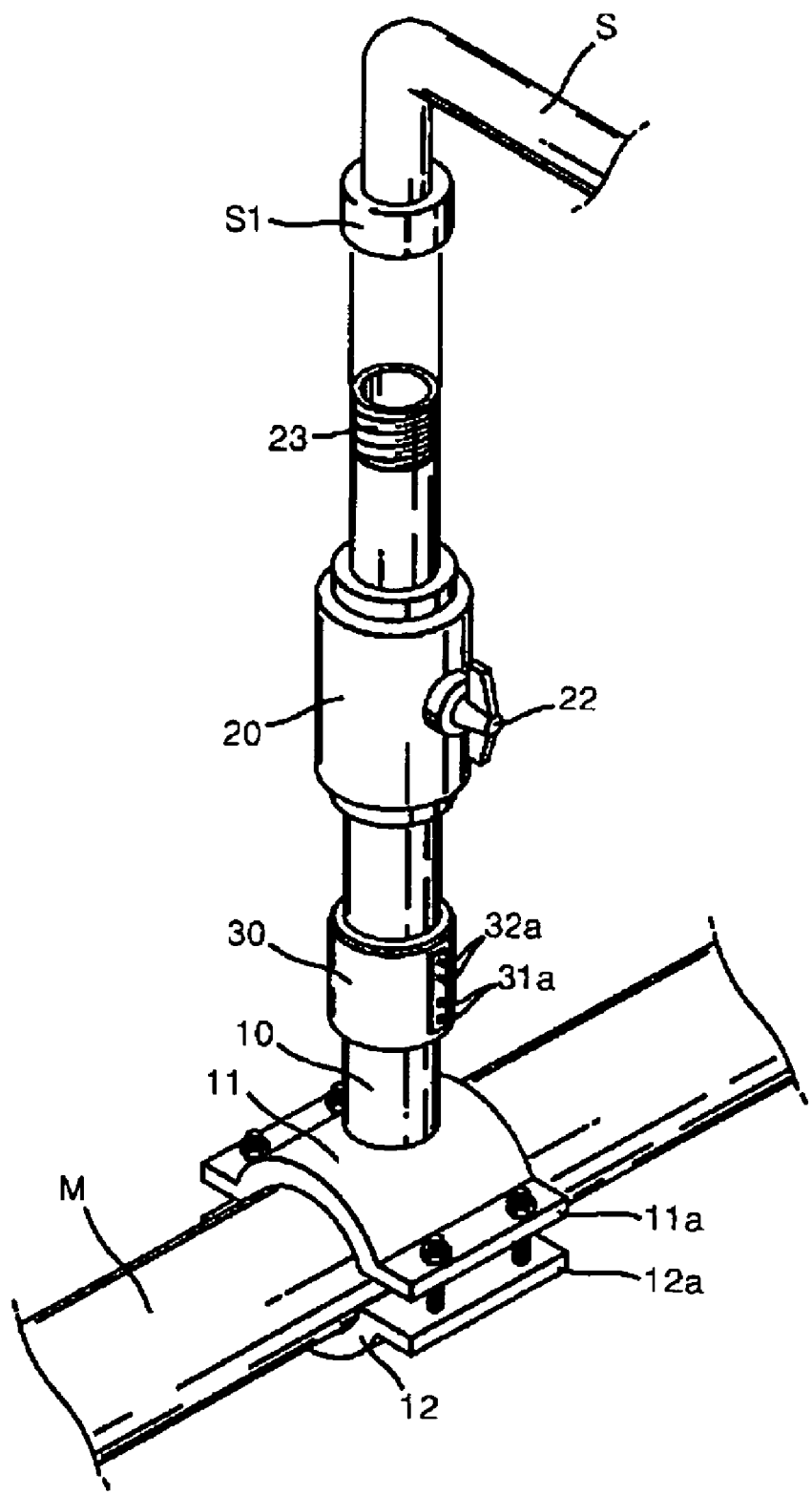
FIG. 1 is a perspective view of a pipe tapping apparatus, according to an embodiment of the present invention.

Hereinafter, embodiments of the present invention will be described in detail with reference to the attached drawings.

Reference now should be made to the drawings, in which the same reference numerals are used throughout the different drawings to designate the same or similar components.

Figure 2:
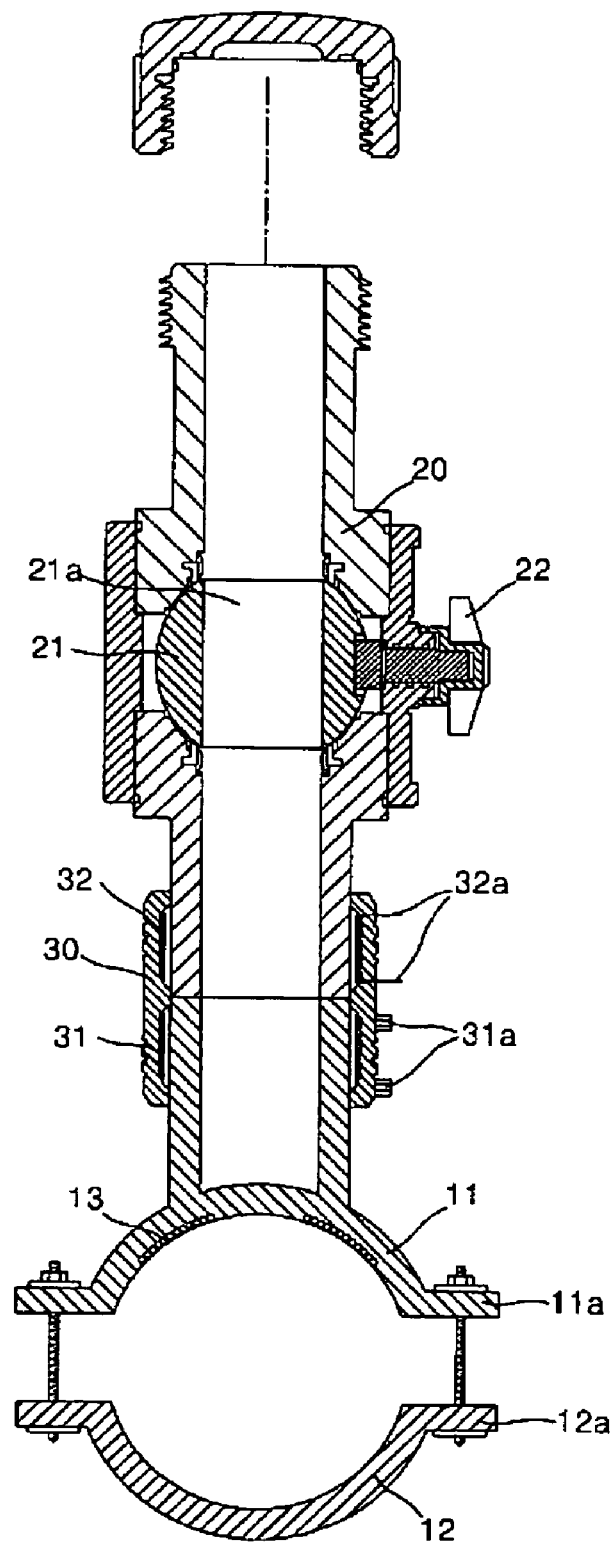
FIG. 2 is a longitudinal sectional view of the pipe tapping apparatus of FIG. 1.

FIG. 1 is a perspective view of a pipe tapping apparatus, according to an embodiment of the present invention. FIG. 2 is a longitudinal sectional view of the pipe tapping apparatus of FIG. 1.

As shown in FIGS. 1 and 2, the pipe tapping apparatus of the present invention couples a sub-pipe (S), which extends to a household or building using gas or city water (hereinafter, referred to simply as fluid), to an outer surface of a main-pipe (M) which is arrayed in the ground to pass the fluid through the main-pipe (M).

The pipe tapping apparatus of the present invention includes a base pipe 10 which is coupled at a predetermined position to the outer surface of the main-pipe (M) arrayed in the ground. The pipe tapping apparatus further includes a coupling pipe 20 to be coupled to the sub-pipe (S) extending to a household or a building, and an electric heat-welding pipe 30 to couple the coupling pipe 20 to the base pipe 10. The base pipe 10, the coupling pipe 20 and the electric heat-welding pipe 30 are made of ABS (acrylonitrile-butadien-styrole), PP (polypropylene) and plastic materials.

The base pipe 10 includes a saddle-shaped socket part 11 to be in close contact with an upper portion of the outer surface of the main pipe 10. The base pipe 10 further includes a bending part 12 which is coupled to the saddle-shaped socket part 11 while being in close contact with a lower portion of the outer surface of the main pipe 10. First flange parts 11a and second flange parts 12a are provided on both ends of the saddle-shaped socket part 11 and both ends of the bending part 12, respectively.

In a state in which both the saddle-shaped socket part 11 and the bending part 12 of the base pipe 10 surround the outer surface of the main pipe (M), the first and second flange parts 11a and 12a are coupled to each other by means of coupling units, such as nuts and bolts. Thus, the base pipe 10 is firmly coupled to the main pipe (M).

The pipe tapping apparatus of the present invention further includes a main heating wire 13 which is provided in the saddle-shaped socket 11 of the base pipe 10 to weld an inner surface of the saddle-shaped socket 11 to the outer surface of the main pipe (M). That is, when power is supplied to the main heating wire 13, a junction surface between the saddle-shaped socket 11 and the main pipe (M) is melted, and thus, the saddle-shaped socket 11 is welded to the main pipe (M).

The coupling pipe 20 has a ball valve 21 therein to control the flow of the fluid passing through the coupling pipe 20. A rotating shaft of the ball valve 21 protrudes outside an outer surface of the coupling pipe 20. A lever 22 is coupled to an outside end of the rotating shaft of the ball valve 21. By the rotation of the lever 22, a fluid passing hole 21a provided in the ball valve 21 rotates along with the lever 22. According to a rotating angle of the lever 22, the coupling pipe 20 is opened or closed.

The coupling pipe 20 further has an outer threaded part 23 on an upper part thereof. The sub-pipe (S), coupled to a household or building, engages with the outer threaded part 23 of the coupling pipe 20. A coupling cap (S1) having an inner threaded part is provided on an end of the sub-pipe (S) to engage with the outer threaded part 23.

The electric heat-welding pipe 30 couples the coupling pipe 20 to the base pipe 10 to be sealed at a junction between the base pipe 10 and the coupling pipe 20. The electric heat-welding pipe 30 includes a first heating wire 31 which is provided in the electric heat-welding pipe 30 to weld the electric heat-welding pipe 30 to the base pipe 10, and a second heating wire 32 which is provided in the electric heat-welding pipe 30 to weld the coupling pipe 20 to the electric heat-welding pipe 30. That is, the first heating wire 31 is placed at a lower position in the electric heat-welding pipe 30. The second heating wire 32 is placed at an upper position in the electric heat-welding pipe 30. First and second power terminals 31a and 32a are connected to the first and second heating wires 31 and 32, respectively. The first and second power terminals 31a and 32a protrude from an outer surface of the electric heat-welding pipe 30. When power is supplied to the first power terminal 31a, the first heating wire 31 is heated. Thus, a lower portion of an inner surface of the electric heat-welding pipe 30 is welded to an upper portion of the outer surface of the base pipe 10. While power is supplied to the second power terminal 32a to heat the second heating wire 32, an upper portion of the inner surface of the electric heat-welding pipe 30 is welded to a lower portion of an outer surface of the coupling pipe 20. Therefore, the coupling pipe 20 is firmly coupled to the base pipe 10.

In the present invention, to satisfy the recent trend of modular production systems, the welding of the coupling pipe 20 to the base pipe 10 is completed before the second power terminal 21 is cut in the coupling pipe 20 or on the same plane as the outer surface of the coupling pipe 20. Thus, the present invention provides a modular production system of the production which allows a process of welding the inner surface of the upper part of the electric heat-welding pipe 30 to the outer surface of the lower part of the coupling pipe 20 using the second heating wire 32 heated by the power supplied to the second power terminal 32a to be excluded from a construction process in a construction site.

Figure 3:
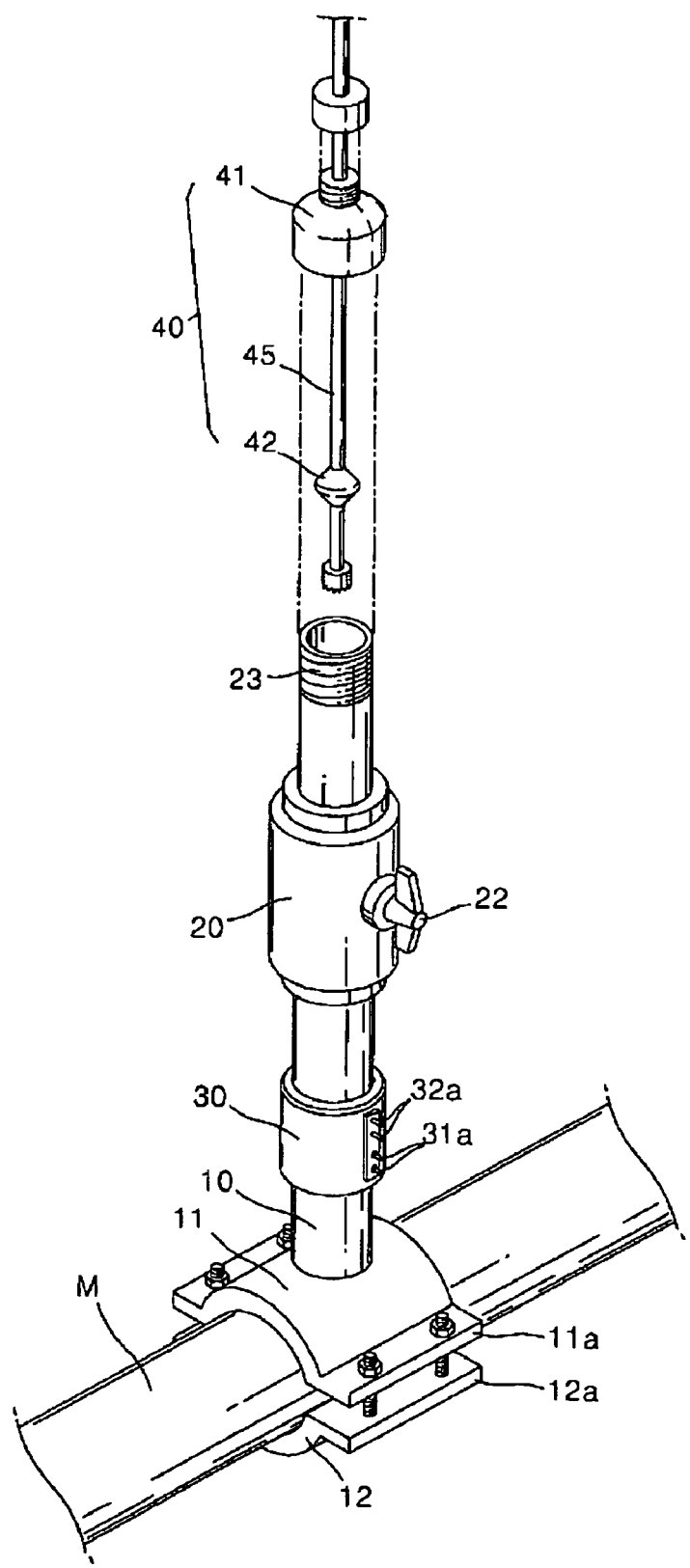
FIG. 3 is a perspective view showing a cutting drill guide part to be inserted into the pipe tapping apparatus of FIG. 1.
Figure 4:
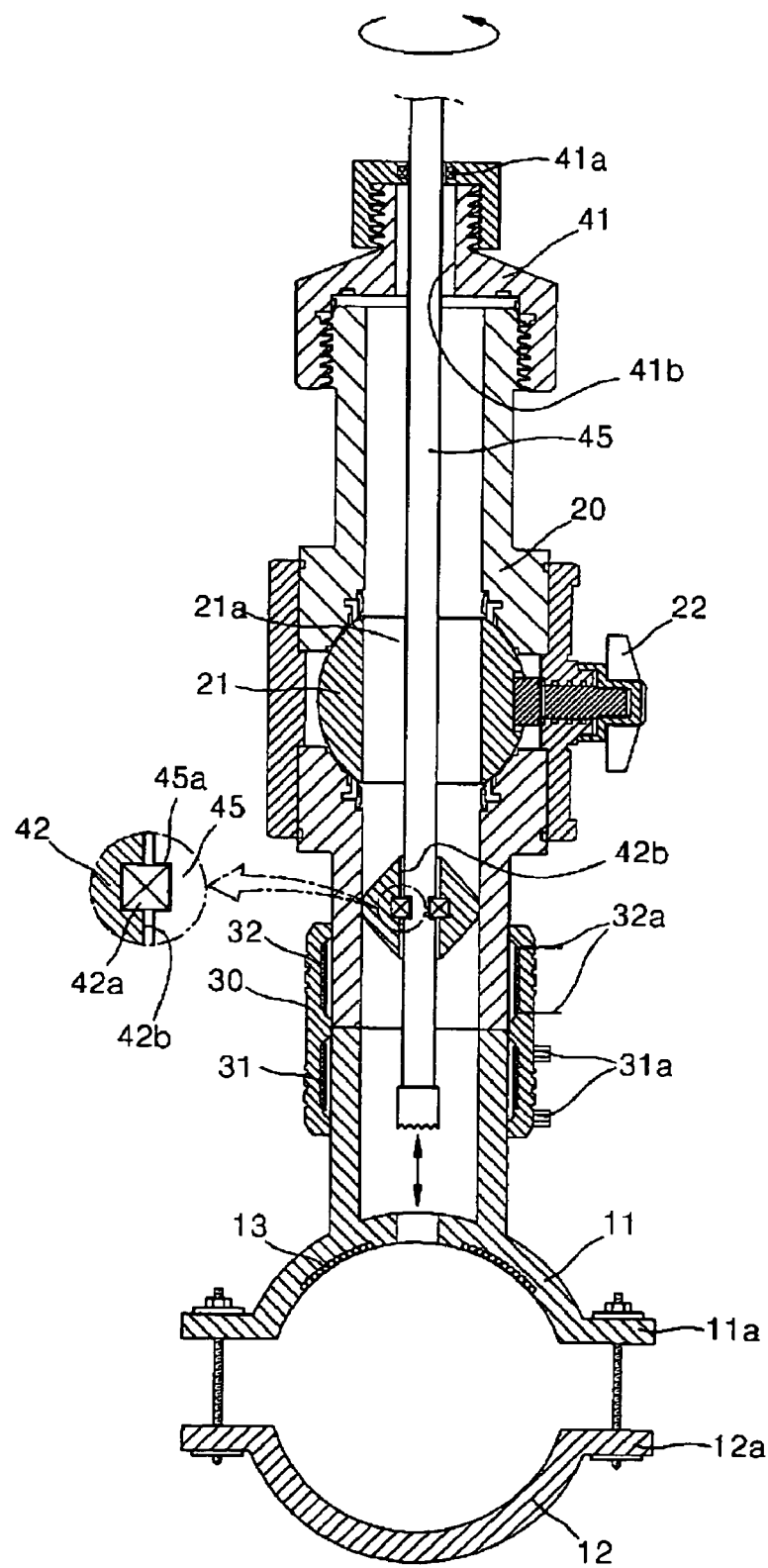
FIG. 4 is a sectional view showing a state in which the cutting drill guide part of FIG. 3 is placed in both a base pipe and a coupling pipe of the pipe tapping apparatus of the present invention.

FIG. 3 is a perspective view showing a cutting drill guide part to be inserted into the pipe tapping apparatus of FIG. 1. FIG. 4 is a sectional view showing a state in which the cutting drill guide part 40 of FIG. 3 is placed in both the base pipe 10 and the coupling pipe 20.

To supply fluid passing through the main pipe (M) to the sub-pipe (S), a hole must be formed on a junction part between the main pipe (M) and a lower end of the base pipe 10. To achieve the above-mentioned purpose, the pipe tapping apparatus of the present invention is fastened at a desired position to the outer surface of the main pipe (M), as shown in FIGS. 3 and 4. Thereafter, the cutting drill guide part 40 is inserted into the pipe tapping apparatus.

The cutting drill guide part 40 includes a second positioning unit 42 which is placed in the base pipe 10 to move vertically, with a second through hole 42b provided in the center of the second positioning unit 42. The cutting drill guide part 40 further includes a first positioning unit 41 which is removably coupled to an end of the coupling pipe 20. A first through hole 41b is provided at the center of the first positioning unit 41. The cutting drill guide part 40 further includes a cutting drill 45 passing through the first and second through hole 41b and 42b of the first and second positioning unit 41 and 42. The cutting drill 45 has a cutting blade 46 which is provided on a lower end of the cutting drill 45 for boring holes.

The second positioning unit 42 is placed at a predetermined position in the base pipe 10 after passing through the fluid passing hole 21a of the ball valve 21. The second positioning unit 42 supports the cutting drill 45 so that the cutting drill 45 stably rotates around an axis in the base pipe 10. As shown in FIG. 4, an annular groove 45a is formed around an outer surface of the cutting drill 45. A bearing 42a is provided in the annular groove 45a in the second through hole 42b to engage with the annular groove 45a. Thus, the second positioning unit 42 is not removed from the cutting drill 45 while the cutting drill 45 smoothly rotates.

The first positioning part 41 is removably coupled to the outer threaded part 23 of the coupling pipe 20. The first positioning part 41 supports the cutting drill 45 passing the first through hole 41b of the first positioning part 41 so that the cutting drill 45 can stably rotate around an axial center in the coupling pipe 20. Another bearing 41a is provided in the first through hole 41b to provide smooth rotation of the cutting drill 45.

The cutting drill 45 is coupled at an upper end thereof protruding outside the first positioning unit 41 to a drive motor or a T-shaped handle to manually rotate the cutting drill 45. Therefore, the cutting drill 45 is rotated by the drive motor or by the T-shaped handle is manually rotated by a user. Thus, the cutting blade 46 of the cutting drill 45 bores the hole on the junction part between the main pipe (M) and the lower end of the base pipe 10.

As described above, the present invention provides a pipe tapping apparatus to easily couple a sub-pipe to an existing main pipe arranged in the ground, thus reducing construction costs, and increasing labor efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pipe tapping apparatus, by which a sub-pipe branches from a main pipe through an electric heat-welding process and a tapping process is executed using a cutting drill, comprising:
- a base pipe, comprising:
  - a saddle-shaped socket part to be in close contact with an upper portion of an outer surface of the main pipe to pass a fluid therein; and
  - a bending part coupled to the saddle-shaped socket part while being in close contact with a lower portion of the outer surface of the main pipe;
- a coupling pipe to be coupled to the sub-pipe extending to a predetermined place in which the supplied fluid is used, with a ball valve provided in the coupling pipe to control a flow of the fluid passing through the coupling pipe;
- an electric heat-welding pipe to couple the coupling pipe to the base pipe, the electric heat-welding pipe comprising a first heating wire which is provided in the electric heat-welding pipe to weld the electric heat-welding pipe to the base pipe, and a second heating wire which is provided in the electric heat-welding pipe to integrate the coupling pipe with the electric heat-welding pipe; and
- a first positioning unit removably coupled to an end of the coupling pipe, with a first through hole provided in a center of the first positioning unit, thus guiding a process of tapping the main pipe using the cutting drill passing through the first through hole of the first positioning unit.

2. The pipe tapping apparatus according to claim 1, further comprising:
- a main heating wire provided in the saddle-shaped socket of the base pipe to weld an inner surface of the saddle-shaped socket to the outer surface of the main pipe.

3. The pipe tapping apparatus according to claim 1, further comprising:
- a second positioning unit placed in the base pipe to move vertically, with a second through hole provided in a center of the second positioning unit.

4. The pipe tapping apparatus according to claim 1, wherein the welding of the coupling pipe to the base pipe is completed before a power terminal coupled to the second heating wire is cut in the coupling pipe or on the same plane as the outer surface of the coupling pipe, thus providing a module system which allows a process of welding an inner surface of an upper part of the electric heat-welding pipe to an outer surface of a lower part of the coupling pipe using the second heating wire heated by power supplied to the power terminal to be excluded from a construction process in a construction site.

* * * * *